G. W. Holly,

Automatic Gate,

No. 2,738. Reissued Aug. 20, 1867.

Witnesses:
Merrill R. Gibson
Solomon Holly

Inventor
George W. Holly

N. PETERS, PHOTO-LITHOGRAPHER, WASHINGTON, D. C.

United States Patent Office.

GEORGE W. HOLLY, OF LOW MOOR, IOWA.

*Letters Patent No.* 58,827, *dated October* 16, 1866; *reissue No.* 2,738, *dated August* 20, 1867.

IMPROVED METHOD OF HANGING DOORS.

The Schedule referred to in these Letters Patent and making part of the same.

TO ALL WHOM IT MAY CONCERN:

Be it known that I, GEORGE W. HOLLY, of Low Moor, in the county of Clinton, and State of Iowa, have invented certain new Improvements in Methods of Hanging and Operating Gates and Doors; and I do hereby declare that the following is a full, clear, and exact description thereof, which will enable those skilled in the art to make and use the same, reference being had to the accompanying drawings, forming part of this specification, and to the letters of reference marked thereon, in which—

Figure 3:
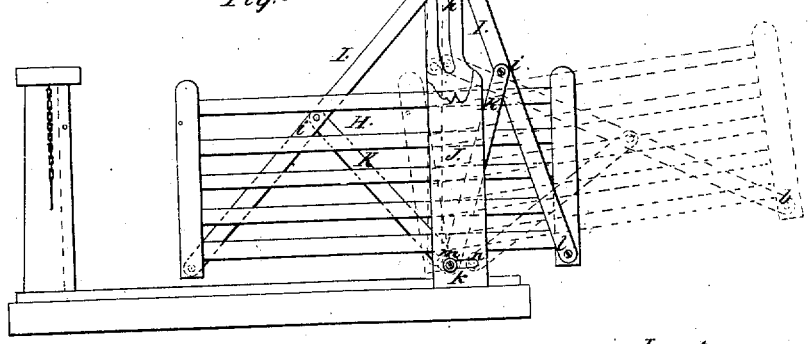

Figure 3, a side view of a gate hung according to my invention.

Similar letters of reference indicate corresponding parts.

Whereas gates or similar structures have been suspended to bracing-levers jointed to each other and to the gate or other structure, and to fixed works or posts so arranged as to produce what is termed a parallel movement of such gate or other structure, such bracing-levers being attached or pivoted to such gate at or near its centre, and where the suspending-braces are pivoted at the same point upon opposite sides of the same, thus bringing the whole weight of the gate upon a single pivot or point, also requiring other appliances to hold the gate in a horizontal position: Now, therefore—

The first part of my invention consists in suspending gates and doors by two pairs of bracing-levers or bars jointed together and to a fixed support, when one pair of said bracing-bars is jointed or pivoted to the gate or door at or near its end, edge, or side, and its opposite pair is jointed to the gate or door at the opposite end, edge, or side, thus causing each pair of braces or bars to act separately upon opposite ends or sides of such gate or door, so that it will rest securely and steadily, by its own weight alone, in the supporting pivots of the two pairs of supporting-bars.

The second part of my invention has reference to an arrangement, in combination with separate pairs of bracing-bars supporting, respectively, opposite ends of the gate or other structure, whereby that point or fixture to which the rear supporting-brace or bar is jointed to the gate-post or structure is made adjustable, so that, as the gate assumes its open position, the rear end of it is elevated above the horizontal plane in which the front end moves, or in which the gate would move were not said pivot adjusted, thereby enabling it to pass freely over obstructions which might accumulate, as snow or ice in winter, saving the labor that might otherwise be required to keep its track clear.

The third part of my invention has reference to mechanism for opening and closing doors and gates, when such doors and gates are suspended by jointed bracing or supporting-bars, jointed to a fixed support, and provided with guiding-slots, such bracing-bars being jointed or pivoted, one pair at or near one end, and the other pair at or near the other end of said doors and gates, my arrangement consisting in mechanism (which may be extended to any desirable distance from the door or gate for the purpose of being operated upon from a carriage or horse) so arranged and operating upon the upper ends of said braces or bars as to alternately elevate and depress them in their respective guiding-slots, thereby opening or closing said door or gate.

Figure 1:
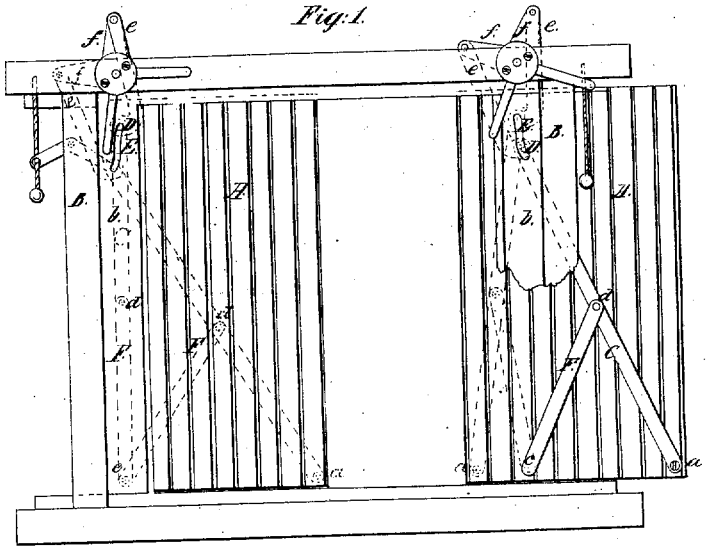
Figure 1 is a side view of a pair of doors hung and arranged to operate according to my invention.
Figure 2:
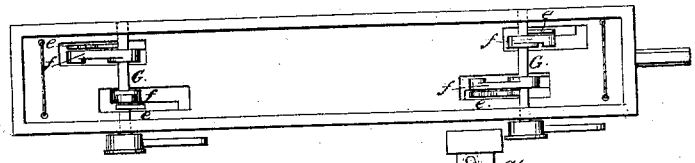
Figure 2 is a plan or top view of the same.

A A (fig. 1) represent two doors fitted in a framing or casing, B. To each door A, at its lower end and on both sides, there are connected by pivot *a* the lower ends of the bars or braces C. The upper ends of these bars have each a pin, D, projecting horizontally from them. These pins pass through slots E made in the posts *b* of the framing or casing, and to each post *b*, at its lower part, is secured, by a pivot, *c*, a bar, F. The upper ends of these bars are pivoted to the bars C, as shown at *d*. The bars C at one side of the door are connected to their inner or front edges, and said bars at the opposite sides of the doors are connected to the outer edges of the same. The slots E serve as guides for the bars C, and they are curved as shown in fig. 1. The doors, it will be seen by this arrangement, are supported by the bars F, and the bars C control the movement of the doors, the curvature of the slots E, which are of slight cyma-form, causing the doors to slide in a horizontal direction, or nearly so. The doors may be moved, opened, and closed directly by hand, or the upper ends of the bars C may be connected, by strips of metal or other material, to arms *f f*, which are keyed on shaft G, in the top of the framing or casing, at right angles to each other. By turning these shafts, first in one direction and then in the other, the arms *f* and rods or strips *e*, by their action on the bars C, will open and close the doors.

It will at once be seen that the doors, in consequence of being supported by and working upon the pivoted bars F, will slide easily, and that the curvilinear movement made by said bars F in opening and closing the doors is compensated for by the bars C, which are pivoted at their lower ends to the lower parts of the door, and by their movement cause the doors to move or slide about horizontally, the curvature of the slots aiding in effecting this movement. I do not confine myself, however, to any precise shape of slots E. They may be modified in form, be perfectly straight or otherwise, and effect the same result, this being controlled by the relative lengths of the bars C and F and the points at which they are pivoted to the doors and to the framework *b*. I have preferred, in this case, to give the slots some degree of curvature.

In fig. 3 my invention is shown as applied to gates, (with the exception of the mechanism for opening and closing it.) H represents the gate, having the lower end of a brace or bar, I, pivoted to each side of it, and at opposite ends of the same, near its bottom. The upper ends of the bar I are provided with horizontal pins *g*, which work in slots *h* in the inner side of the gate-posts J J, and to the lower part of the posts J there are pivoted the lower ends of the bars K, as shown at *k'*, the upper ends of said bars being pivoted to the bars I, as shown at *i*. When the gate H is opened and closed, it will be seen that one bar I is raised as the other falls, the same as is the case with the bars C of the doors A, only to a greater extent, proportionate to the greater movement of the gate H; such opposite movement of the upper ends of said bars resulting from pivoting their lower ends to opposite ends of said gate or door. The slots *h* in the posts J J of the gate are curved at their lower ends, as shown in fig. 3. This curvature admits of the gate settling down as it reaches an open or closed position, allowing it to rest upon a fixed support, thereby relieving the extended brace or bar of all strain or tendency to incline the post from its perpendicular position, the gate being raised slightly as it passes out of the lower curved end of slot *h*.

I would here remark that it is not essential to the successful application of my invention that the bars I I should be pivoted to the extreme ends of the gate, but they should be sufficiently near the ends, or far enough from the centre, so that one bar shall operate to support one end of the gate, and the opposite bar support the opposite end of the same. At the lower part of the post J is a slot, *k*, commencing at the point *m* where the bar K is pivoted to the post J, said slot extending toward the rear end of the gate. If the bar K be pivoted or secured at the rear end of said slot, as shown at *n*, the rear end of the gate will be gradually elevated as it reaches its open position, as shown in dotted lines. When desired, the gate may be placed in such position to enable it to rise over snow in winter, or such obstacles as might accumulate in its track.

I would remark that in case it is desired to set the gate upon a hill-side or inclined position, and to have both ends of the gate move on an inclined plane, it is only necessary to move the pivoting-point of both the supporting-bars K in the direction of the upward incline.

I would also further remark that the shafts G, upon which are keyed the arms *f f*, may be extended to any convenient distance from the doors or gate, for the purpose of opening and closing them from a carriage or horse.

I would also remark that I do not confine my invention to the use of rocking-shaft G, with its arms *f f* and rods *e*, as the result of the combination is to open or close said doors by simply elevating one bar, C, and depressing its opposite bar. Therefore, I accomplish the same result by passing cords or chains over pulleys at the top of the posts or framing, and attach to the upper ends of said bars C, arranged to elevate and depress them. It will be seen that, by elevating one bar in the slot, to move the gate or door, its opposite bar must necessarily descend, carrying with it the cords or rods by means of which its movement is to be reversed; therefore it is not necessary that said connection be a rigid one, as in the case of the rods or strips *e*.

I would also remark that the method here shown and described for opening and closing doors operates equally well and substantially the same when applied to gates; therefore I do not limit the application of my invention, or any of its parts, to doors.

I would also remark that a spring-catch may be used to engage with the pins D of the bar C in fig. 1, in order to secure the door in a closed state. Any suitable fastening, however, may be used for this purpose.

Having thus fully described the nature and operation of my invention, what I claim, and desire to secure by Letters Patent, is—

The arms *f f* and rods *e e*, arranged and operating relatively with the bars C F and door or gate A, substantially as described, and for the purpose specified.

GEORGE W. HOLLY.

Witnesses:
MERITT P. GIBSON,
SOLOMON HOLLY.